United States Patent
Tanahashi et al.

(10) Patent No.: US 12,519,139 B2
(45) Date of Patent: Jan. 6, 2026

(54) SECONDARY BATTERY AND METHOD FOR PRODUCING SECONDARY BATTERY

(71) Applicant: PRIME PLANET ENERGY & SOLUTIONS, INC., Tokyo (JP)

(72) Inventors: Yuta Tanahashi, Kakogawa (JP); Kazutaka Mita, Kobe (JP); Takafumi Tsukagoshi, Kasai (JP); Shinya Miyazaki, Tokushima (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 960 days.

(21) Appl. No.: 17/670,868

(22) Filed: Feb. 14, 2022

(65) Prior Publication Data

US 2022/0271346 A1     Aug. 25, 2022

(30) Foreign Application Priority Data

Feb. 22, 2021    (JP) .................................. 2021-26204

(51) Int. Cl.
    *H01M 10/00*        (2006.01)
    *H01M 10/0525*      (2010.01)
               (Continued)

(52) U.S. Cl.
    CPC ... *H01M 10/0587* (2013.01); *H01M 10/0525* (2013.01); *H01M 10/058* (2013.01);
               (Continued)

(58) Field of Classification Search
    CPC ......... H01M 10/0587; H01M 10/0525; H01M 50/446; H01M 50/449; H01M 50/533;
               (Continued)

(56) References Cited

U.S. PATENT DOCUMENTS 10,505,232 B2    12/2019    Zeng et al.
2006/0093910 A1    5/2006    Yoon et al.
                 (Continued)

FOREIGN PATENT DOCUMENTS

CN        105917512 A    8/2016
CN        110224181 A    9/2019
              (Continued)

OTHER PUBLICATIONS

Machine Translation of JP 2014-137988, obtained Apr. 2025 (Year: 2014).*

*Primary Examiner* — Nicholas P D'Aniello
(74) *Attorney, Agent, or Firm* — Finnegan, Henderson, Farabow, Garrett and Dunner, LLP

(57) ABSTRACT

The present disclosure provides a secondary battery in which the occurrence of springback is suppressed in a wound electrode body having specific external shape dimensions. The secondary battery disclosed herein has a flat-shaped wound electrode body and a battery case that accommodates the wound electrode body. A separator of such a secondary battery has a band-shaped base material layer, and a surface layer containing inorganic particles and a binder. At least one from among a positive electrode plate and a negative electrode plate is bonded to the surface layer of the separator. A width dimension of the positive electrode active material layer in the secondary battery disclosed herein is 200 mm or larger, a thickness dimension of the wound electrode body is 8 mm or larger, and a height dimension of the wound electrode body is 120 mm or smaller. The art disclosed herein allows suitably suppressing the occurrence of springback, despite using a wound electrode body having external shape dimensions that readily give rise to springback.

15 Claims, 9 Drawing Sheets

(51) Int. Cl.
  *H01M 10/058* (2010.01)
  *H01M 10/0587* (2010.01)
  *H01M 50/446* (2021.01)
  *H01M 50/449* (2021.01)
  *H01M 50/533* (2021.01)
  *H01M 50/538* (2021.01)

(52) U.S. Cl.
  CPC ....... *H01M 50/446* (2021.01); *H01M 50/449* (2021.01); *H01M 50/533* (2021.01); *H01M 50/538* (2021.01)

(58) Field of Classification Search
  CPC ............. H01M 50/538; H01M 10/058; H01M 10/0431
  See application file for complete search history.

(56) References Cited

U.S. PATENT DOCUMENTS

| | | | |
|---|---|---|---|
| 2011/0104541 A1 | 5/2011 | Ahn et al. | |
| 2011/0293977 A1 | 12/2011 | Kim et al. | |
| 2012/0077065 A1* | 3/2012 | Kamiya | H01M 50/566 429/94 |
| 2014/0004400 A1 | 1/2014 | Ueki et al. | |
| 2014/0193691 A1 | 7/2014 | Ueki et al. | |
| 2015/0340729 A1 | 11/2015 | Ko et al. | |
| 2016/0293922 A1 | 10/2016 | Umeyama et al. | |
| 2016/0336576 A1 | 11/2016 | Shinoda et al. | |
| 2018/0166682 A1 | 6/2018 | Lee et al. | |
| 2018/0375070 A1 | 12/2018 | Wakimoto et al. | |
| 2019/0273251 A1 | 9/2019 | Matsuda et al. | |
| 2022/0069359 A1 | 3/2022 | Yamada et al. | |

FOREIGN PATENT DOCUMENTS

| | | |
|---|---|---|
| EP | 3 885 126 A1 | 9/2021 |
| JP | 2006-128132 A | 5/2006 |
| JP | 2011-096620 A | 5/2011 |
| JP | 2012-513088 A | 6/2012 |
| JP | 2014-137988 A | 7/2014 |
| JP | 2015-138733 A | 7/2015 |
| JP | 2015-141847 A | 8/2015 |
| JP | 2016-189261 A | 11/2016 |
| JP | 2019-008972 A | 1/2019 |
| JP | 2019-067653 A | 4/2019 |
| JP | 2019-169349 A | 10/2019 |
| JP | 2020-149952 A | 9/2020 |
| KR | 10-2010-0071941 A | 6/2010 |
| KR | 10-2014-0103087 A | 8/2014 |
| WO | WO 2012/124093 A1 | 9/2012 |
| WO | WO 2012/150635 A1 | 11/2012 |
| WO | WO 2019/176290 A1 | 9/2019 |
| WO | WO 2020/105673 A1 | 5/2020 |
| WO | WO 2020/129881 A1 | 6/2020 |

\* cited by examiner

SECONDARY BATTERY AND METHOD FOR PRODUCING SECONDARY BATTERY

CROSS REFERENCE TO RELATED APPLICATIONS

The present application claims priority to Japanese Patent Application No. 2021-26204 filed on Feb. 22, 2021, the entire contents whereof are incorporated in the present specification by reference.

BACKGROUND

1. Technical Field

The present disclosure relates to a secondary battery and to a method for producing a secondary battery.

2. Description of the Related Art

A secondary battery such as a lithium ion secondary battery usually has an electrode body having a pair of electrode plates (positive electrode plate and negative electrode plate), and a battery case in which the electrode body is accommodated. Examples of such an electrode body of a secondary battery include a wound electrode body in which a positive electrode plate and a negative electrode plate are wound across a separator. A porous band-shaped film or the like having a base material layer made of a resin material such as polyethylene (PE) can be ordinarily used as a separator in such a wound electrode body. A separator having a heat-resistant layer formed on the surface of the base material layer may be used herein, from the viewpoint of improving the safety of the secondary battery. For instance WO 2012/124093 discloses a separator having a porous resin layer (base material layer) and a porous heat-resistant layer laid up on at least one face of the resin layer. The heat-resistant layer contains a filler and a binder made of an inorganic material. A separator having this type of heat-resistant layer suppresses heat shrinkage at the time of rises in temperature, and accordingly allows preventing the occurrence of internal short circuits, and improving the safety of the secondary battery.

SUMMARY

Examples of the shape of the above wound electrode body include a flat shape. Such a flat-shaped wound electrode body is produced through press molding of the cylindrical wound electrode body (cylindrical body) that has been produced through winding of a positive electrode plate and a negative electrode plate across a separator. In such a wound electrode body there are formed a pair of curved portions the outer surface of which is curved, and a flat portion the outer surface of which, connecting the pair of curved portions, is flat. In the flat portion of such a flat-shaped wound electrode body the distance between the positive electrode plate and the negative electrode plate (inter-electrode distance) is small, and thus movement of charge carriers across the electrodes is promoted as a result.

Various studies have been conducted in recent years on the external dimensions of wound electrode bodies, for instance with a view to increasing the capacity of the secondary battery. Studies by the present inventors have revealed that it is difficult, in press molding, to wholly plastically deform a wound electrode body having specific external dimensions, and that springback frequently occurs in which the flat portion expands due to residual elastic action of the curved portions. When such springback occurs, the inter-electrode distance increases in part of the flat portion, and hence, for instance, increases in battery resistance as well as precipitation of charge carriers may occur. Further, the wound electrode body in which springback has occurred becomes difficult to be accommodated in the battery case, which may cause a drop in production efficiency.

It is an object of the present disclosure, arrived at in order to solve the above problems, to provide a secondary battery in which the occurrence of springback is suppressed in a wound electrode body having specific external dimensions.

To attain the above object, the art disclosed herein provides a secondary battery having the following configuration.

The secondary battery disclosed herein has a flat-shaped wound electrode body in which a positive electrode plate and a negative electrode plate are wound across a separator, and a battery case that accommodates the wound electrode body. The flat-shaped wound electrode body has a pair of curved portions, the outer surfaces of which are curved, and a flat portion, the outer surface of which is flat, and which connects the pair of curved portions; and the positive electrode plate has a band-shaped positive electrode core body and a positive electrode active material layer formed on at least one surface of the positive electrode core body; in the secondary battery disclosed herein, the separator has a band-shaped base material layer, and a surface layer formed on at least one surface of the base material layer, and containing inorganic particles and a binder; and at least one of the positive electrode plate and the negative electrode plate in the flat portion is bonded to the surface layer of the separator. In this secondary battery, a width dimension of the positive electrode active material layer is 200 mm or larger, a thickness dimension of the wound electrode body is 8 mm or larger, and a height dimension of the wound electrode body is 120 mm or smaller.

Firstly, the term "width dimension of the positive electrode active material layer" in the present specification denotes the length of the positive electrode active material layer in the direction (winding axis direction) in which the winding axis of the wound electrode body extends. A greater width dimension of the positive electrode active material layer entails a larger size of the wound electrode body, as a result of which the elastic action generated from the curved portions after press molding and exerted on the flat portion tends to increase accordingly. The term "thickness dimension of the wound electrode body" denotes the length of the flat portion in a direction perpendicular to the flat portion. Similarly to the width dimension of the positive electrode active material layer, the elastic action after press molding tends to increase also in a case where the thickness dimension of the wound electrode body increases. The term "height dimension of the wound electrode body" denotes the length from the upper end of one curved portion to the lower end of another curved portion. When the height dimension of such a wound electrode body is made smaller, the curved portions in the pair thereof draw closer to each other, and as a result the elastic action generated by the curved portions readily acts on the entirety of the flat portion. Specifically, the art disclosed herein is aimed at a wound electrode body having external dimensions that readily give rise to springback, namely having a width dimension of the positive electrode active material layer of 200 mm or more, a thickness dimension of 8 mm or more, and a height dimension of 120 mm or less.

As a result of various studies, the inventors found that springback of the wound electrode body is further promoted when using a separator having a heat-resistant layer for the purpose of improving safety. The present inventors addressed this finding as follows. As a result of press molding, an ordinary separator undergoes pressure-deformation along the irregularities of the surface of an electrode plate (positive electrode plate and negative electrode plate), whereupon the separator fits the electrode plate. The occurrence of springback is suppressed upon bonding of the separator and the electrode plate. On the other hand, a separator having a heat-resistant layer exhibits comparatively high strength, and is not prone to deform so as to fit the electrode plate. That is, the springback suppression function of ordinary separators is lost in separators with a heat-resistant layer. The secondary battery disclosed herein was arrived at on the basis of such findings. Specifically, the separator of the secondary battery having the above configuration has a surface layer containing inorganic particles and a binder, in order to prevent internal short-circuits caused by heat shrinkage. Unlike in the case of a conventional heat-resistant layer, however, the surface layer in the art disclosed herein has enough adhesiveness so as to be fitted/bonded to the electrode plates, by press molding. In consequence, the springback suppression effect derived from bonding of the separator and the electrode plates can be elicited properly, and accordingly it becomes possible to suppress springback, without detracting from improvements in safety, even when using a wound electrode body having the external dimensions above.

In a preferred implementation of the secondary battery disclosed herein, the content of the inorganic particles relative to the total mass of the surface layer is from 70 mass % to 80 mass %. The effect of suppressing springback by bonding of the electrode plates and the surface layer is brought out increasingly readily as the content of the inorganic particles in the surface layer is made smaller. When on the other hand the content of the inorganic particles in the surface layer is reduced excessively, the surface layer may become tacky, and the wound electrode body may be difficult to produce. Heat shrinkage of the separator can be suitably prevented through addition of a given or greater amount of inorganic particles to the surface layer. From these viewpoints, the content of the inorganic particles in the surface layer lies preferably in the range from 70 mass % to 80 mass %.

In a preferred implementation of the secondary battery disclosed herein, the surface layer contains at least one type from among alumina particles and boehmite particles, as the inorganic particles. Heat shrinkage of the separator can be prevented as a result.

In a preferred implementation of the secondary battery disclosed herein, the surface layer contains polyvinylidene fluoride as a binder. The springback suppression effect derived from bonding of the electrode plates and the surface layer can be elicited yet more readily.

In a preferred implementation of the secondary battery disclosed herein, the surface layer has a mesh-like structure containing a plurality of voids. High flexibility is elicited as a result in the surface layer, which can therefore contribute to uniformize the thickness of the flat portion of the wound electrode body and to suppress variability in inter-electrode distance.

In an implementation where a surface layer is formed having the above mesh-like structure, preferably the porosity of the surface layer of the separator disposed in a region not opposing the positive electrode plate or the negative electrode plate is 50% or higher. As a result it becomes possible to impart suitable flexibility to the surface layer, and to yet more suitably suppress variability in inter-electrode distance. In the present specification, the "porosity of the surface layer of the separator disposed in a region not opposing the positive electrode plate or the negative electrode plate" signifies the porosity of the surface layer of the separator before press molding.

In a preferred implementation of the secondary battery disclosed herein, the wound electrode body is provided in plurality and accommodated inside the battery case. In such a secondary battery springback can occur in each of a plurality of wound electrode bodies. In this case the influence of springback on the performance of the entire secondary battery is prone to be substantial. In the art disclosed herein, by contrast, springback can be suppressed in each of the plurality of wound electrode bodies, and therefore the art disclosed herein can be suitably adopted in secondary batteries that are provided with a plurality of wound electrode bodies.

In the above implementation where there is provided a plurality of wound electrode bodies, preferably the separator is disposed at the outermost periphery of the wound electrode bodies, and adjacent wound electrode bodies are bonded to each other via the surface layer of the separator. As a result, the movement of the wound electrode bodies in the interior of the battery case is restricted, which in turn allows preventing damage to the wound electrode bodies caused by an external impact or vibration.

In a preferred implementation of the secondary battery disclosed herein, a positive electrode tab group, which is a stack of positive electrode tabs of the exposed positive electrode core body, is formed at one end portion of the wound electrode body in the winding axis direction, and a negative electrode tab group, which is a stack of negative electrode tabs of the exposed negative electrode core body, is formed at another end portion of the wound electrode body in the winding axis direction; and the positive electrode tab group is bent in a state of being joined to a positive electrode collector which is a plate-shaped conductive member, and the negative electrode tab group is bent in a state of being joined to a negative electrode collector which is a plate-shaped conductive member. In a wound electrode body having the above configuration, increases in inter-electrode distance may occur in a region in the vicinity of the electrode tab groups (positive electrode tab group and negative electrode tab group), upon bending of the electrode tabs groups. In the art disclosed herein, by contrast, the separators and the electrode plates are bonded, and as a result it becomes possible to prevent increases in inter-electrode distance in a region in the vicinity of the electrode tab groups.

In a preferred implementation of the secondary battery disclosed herein, the separator is disposed at the outermost periphery of the wound electrode body; a termination portion of the separator is affixed to the outermost surface of the wound electrode body by a winding stop tape; and the winding stop tape is disposed on a straight line that joins the positive electrode tab group and the negative electrode tab group. Unwinding of the wound electrode body can be prevented as a result, and hence it becomes possible to more suitably curtail increases in inter-electrode distance in a region in the vicinity of the electrode tab groups, and to stably join the electrode tab groups and the electrode collectors (positive electrode collector and negative electrode collector).

In a preferred implementation of the secondary battery disclosed herein, the separator is disposed at the outermost periphery of the wound electrode body, and a termination portion of the separator is affixed to the outermost surface of the wound electrode body by a winding stop tape; and a proportion of the thickness of the surface layer of the separator interposed between the positive electrode plate and the negative electrode plate, relative to the thickness of the surface layer of separator disposed in a region not opposing the positive electrode plate or the negative electrode plate, is 0.9 or lower. As a result it becomes possible to prevent the formation of level differences derived from the thickness of the winding stop tape, and to prevent drops in battery performance derived from variability in surface pressure exerted on the flat portion.

In a preferred implementation of the secondary battery disclosed herein, one end portion of the positive electrode plate in a longitudinal direction is disposed, as a positive electrode start portion, inside the flat portion of the wound electrode body, and another end portion is disposed, as a positive electrode termination portion, outside the flat portion of the wound electrode body; and one end portion of the negative electrode plate in the longitudinal direction is disposed, as a negative electrode start portion, inside the flat portion of the wound electrode body, and another end portion is disposed, as a negative electrode termination portion, outside the flat portion of the wound electrode body. In such a configuration the start portions of the electrode plates of the positive electrode and the negative electrode are disposed inside the flat portion of the flat-shaped wound electrode bodies, while the termination portions are disposed outside the flat portion.

In the above-described implementation where the positive electrode start portion and the positive electrode termination portion are disposed at the flat portion, preferably the adhesive strength between the positive electrode start portion and the surface layer is larger than the adhesive strength between the positive electrode termination portion and the surface layer. Thus the effect of suppressing springback can be elicited yet more suitably by relatively increasing the adhesive strength in the interior of wound electrode body.

In the above-described implementation where the positive electrode start portion and the negative electrode termination portion are disposed at the flat portion, preferably the adhesive strength between the positive electrode termination portion and the surface layer is larger than the adhesive strength between the negative electrode termination portion and the surface layer. Permeability of the electrolyte solution into the wound electrode body can be increased as a result.

In an implementation where the positive electrode start portion and the negative electrode termination portion are disposed inside the flat portion, a plurality of the wound electrode bodies are accommodated inside the battery case, the separator is disposed at the outermost periphery of the wound electrode bodies, and in a case where adjacent wound electrode bodies are bonded to each other via the surface layer of the separator, preferably the adhesive strength between the adjacent wound electrode bodies is larger than the adhesive strength between the positive electrode termination portion and the surface layer. As a result, the movement of the wound electrode bodies inside the battery case can be restricted more reliably, and damage to the wound electrode bodies can be prevented yet more properly.

In another aspect, the art disclosed herein provides a method for producing a secondary battery. This production method includes producing a cylindrical body by winding of a positive electrode plate and a negative electrode plate across a separator; producing a flat-shaped wound electrode body by pressing the cylindrical body; and accommodating the wound electrode body in the interior of a battery case. The wound electrode body in the production method disclosed herein is any one of the wound electrode bodies of the implementations described above. Such a production method allows producing a secondary battery in which springback of a wound electrode body is suitably suppressed.

DETAILED DESCRIPTION

Embodiments of the art disclosed herein will be explained next with reference to accompanying drawings. Any features other than the matter specifically set forth in the present specification and that may be necessary for carrying out the present specification (for instance the general configuration and production process of a battery) can be regarded as instances of design matter, for a person skilled in the art, based on known art in the relevant technical field. The art disclosed herein can be implemented on the basis of the disclosure of the present specification and common technical knowledge in the relevant technical field. In the present specification, the notation "A to B" for a range signifies a value "equal to or larger than A and equal to or smaller than B", and is meant to encompass also the meaning of being "preferably larger than A" and "preferably smaller than B".

In the present specification, the term "secondary battery" denotes a power storage device in general that is capable of being charged and discharged repeatedly as a result of movement of charge carriers across a pair of electrodes (positive electrode and negative electrode) via an electrolyte. Such a secondary battery encompasses not only so-called storage batteries such as lithium ion secondary batteries nickel-metal hydride batteries and nickel cadmium batteries, but also for instance capacitors such as electrical double layer capacitors. An embodiment targeting a lithium ion secondary battery, from among these secondary batteries, will be explained below.

The reference symbol X in the figures of the present specification denotes a "width direction", the reference symbol Y denotes a "depth direction", and the reference symbol Z denotes a "height direction". Further, the reference symbol F in the depth direction X denotes "front" and Rr denotes "rear". The reference symbol L in the width direction Y denotes "left" and R denotes "right". The reference symbol U in the height direction Z denotes "up", and D denotes "down". These directions are defined however for convenience of explanation, and are not intended to limit the manner in which the secondary battery disclosed herein is disposed during use.

First Embodiment

1. Structure of a Secondary Battery

Figure 1:
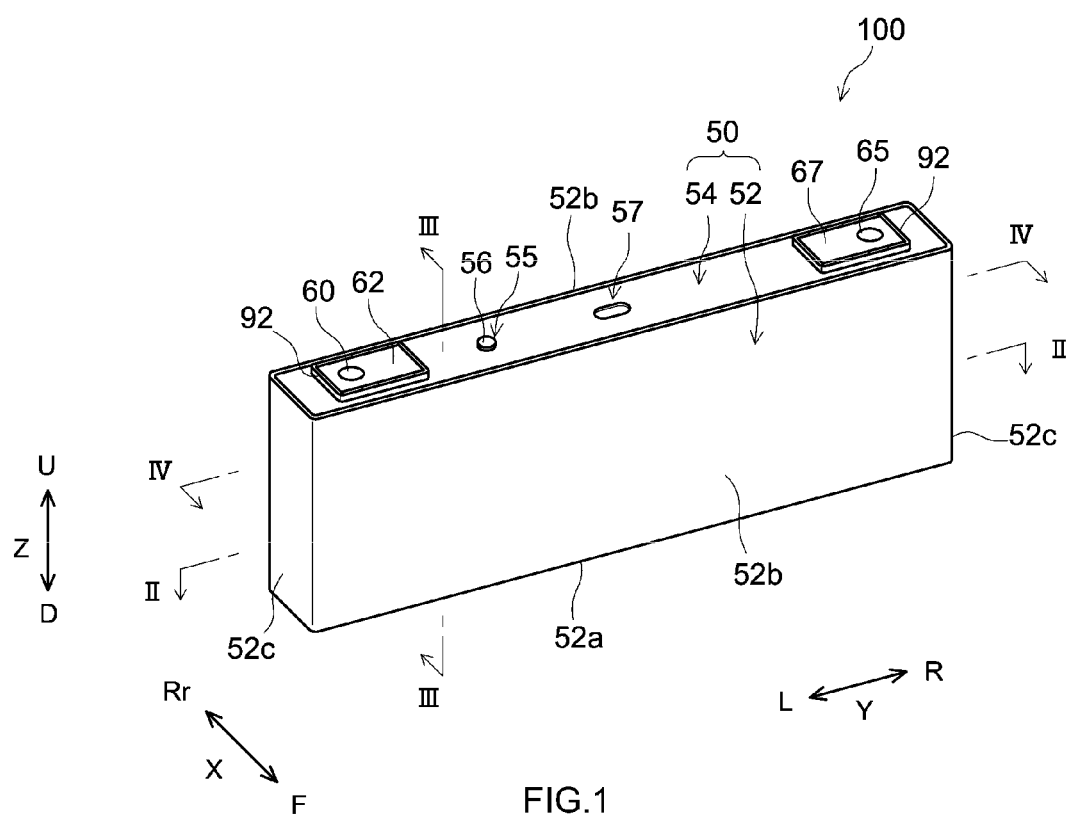
FIG. 1 is a perspective-view diagram illustrating schematically a secondary battery according to an embodiment.
Figure 2:
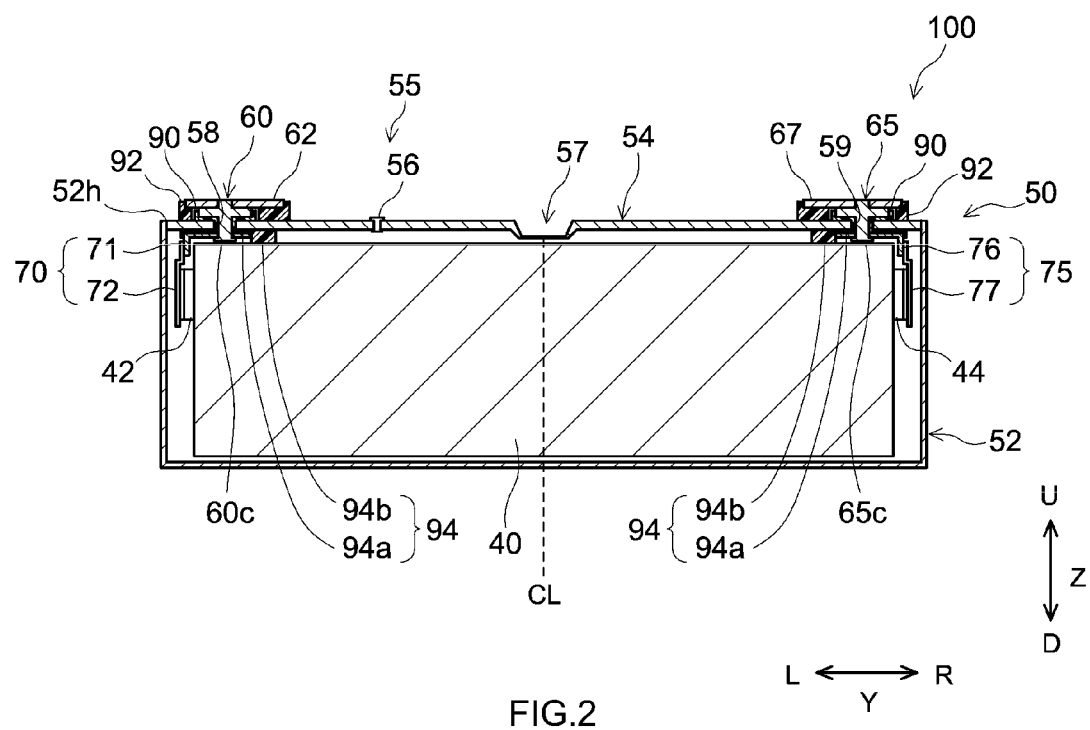
FIG. 2 is a schematic longitudinal cross-sectional diagram along line II-II in FIG. 1.
Figure 3:
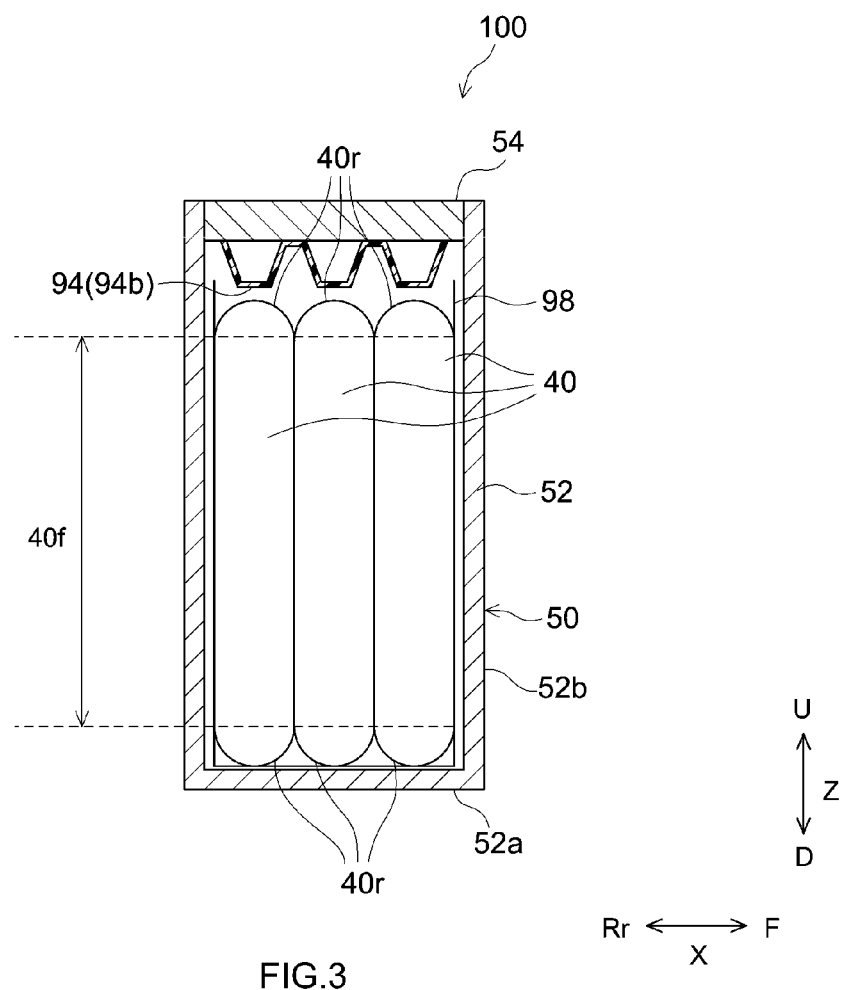
FIG. 3 is a schematic longitudinal cross-sectional diagram along line III-III in FIG. 1.
Figure 4:
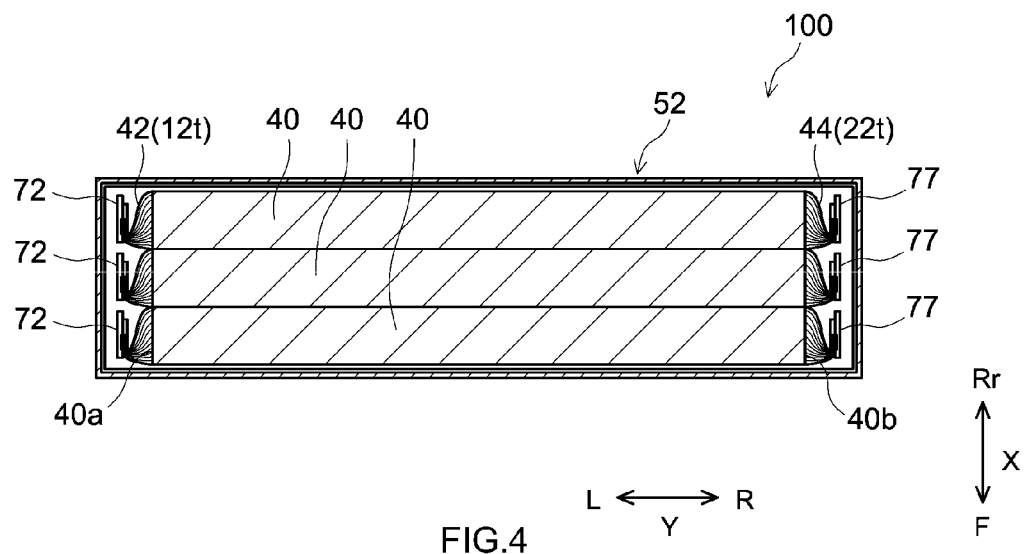
FIG. 4 is a schematic transversal cross-sectional diagram along line IV-IV in FIG. 1.
Figure 5:
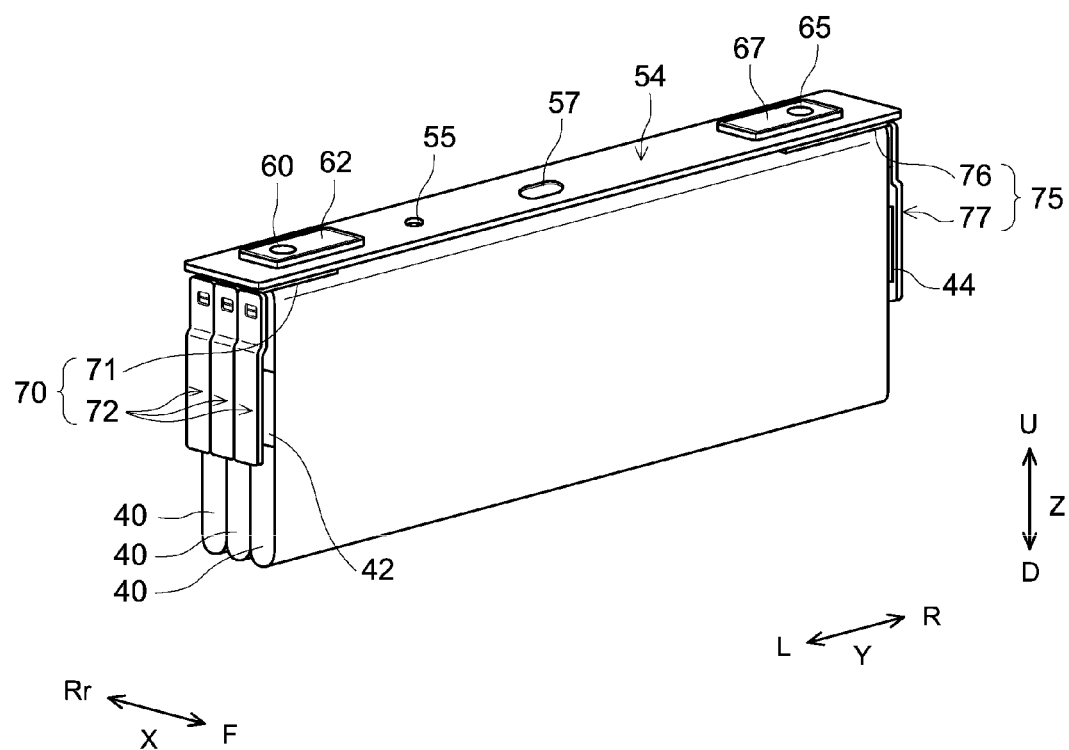
FIG. 5 is a perspective-view diagram illustrating schematically an electrode body attached to a sealing plate.
Figure 6:
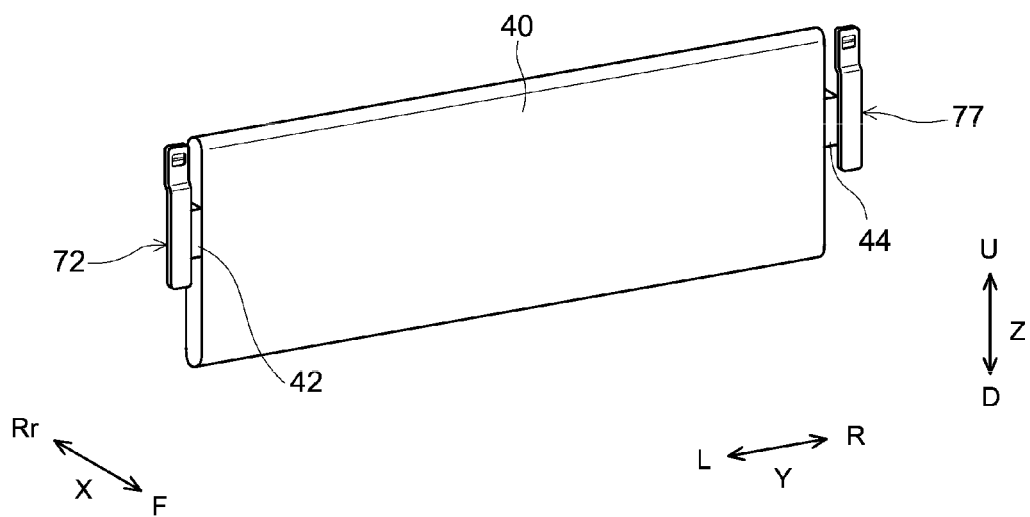
FIG. 6 is a perspective-view diagram illustrating schematically an electrode body to which a positive electrode second collector and a negative electrode second collector are attached.
Figure 7:
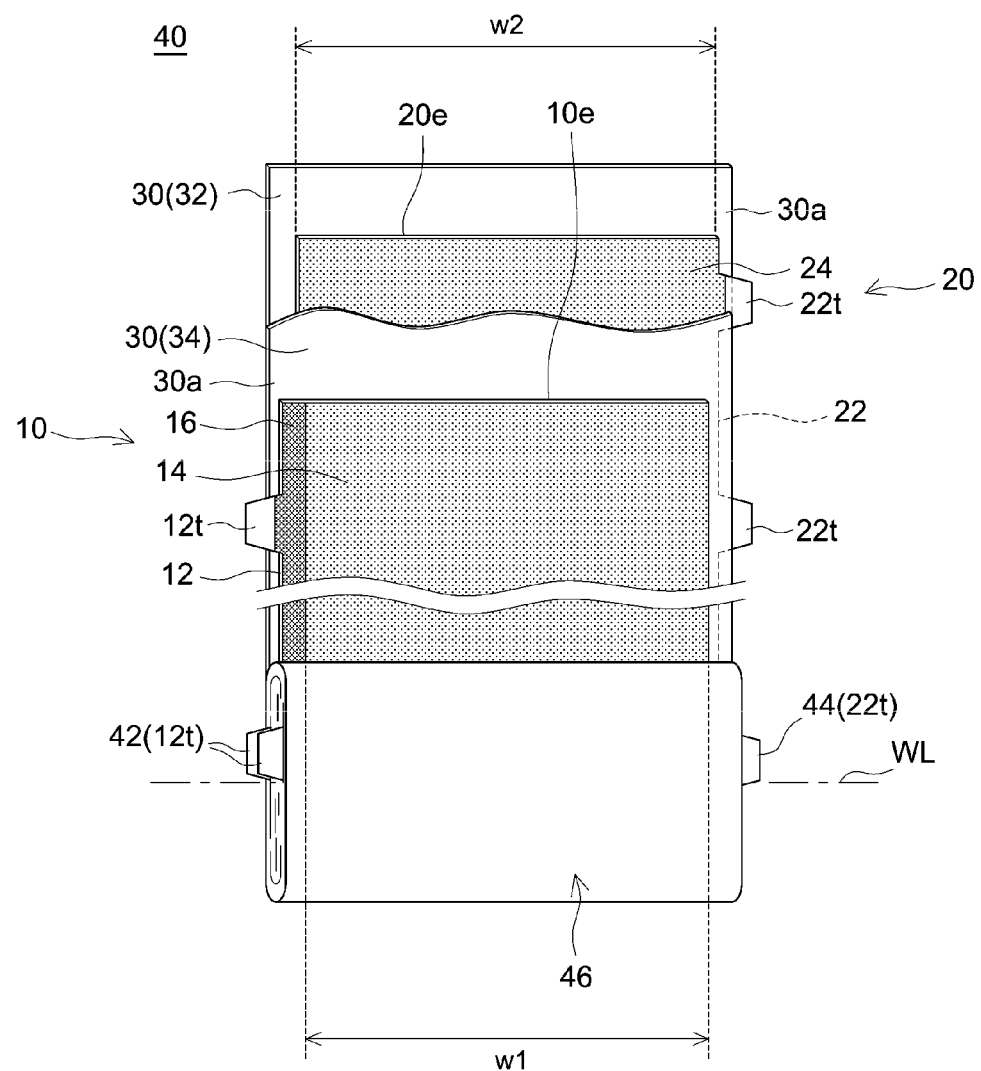
FIG. 7 is a schematic diagram illustrating the configuration of a wound electrode body of a secondary battery according to an embodiment.
Figure 8:
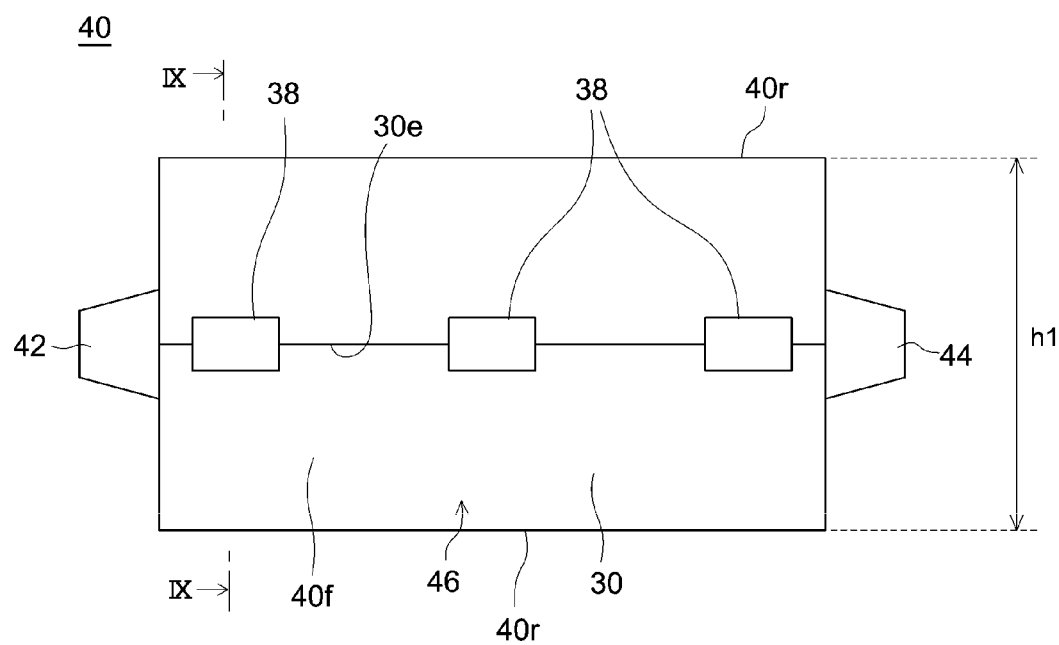
FIG. 8 is a front-view diagram illustrating schematically the wound electrode body of FIG. 7.
Figure 9:
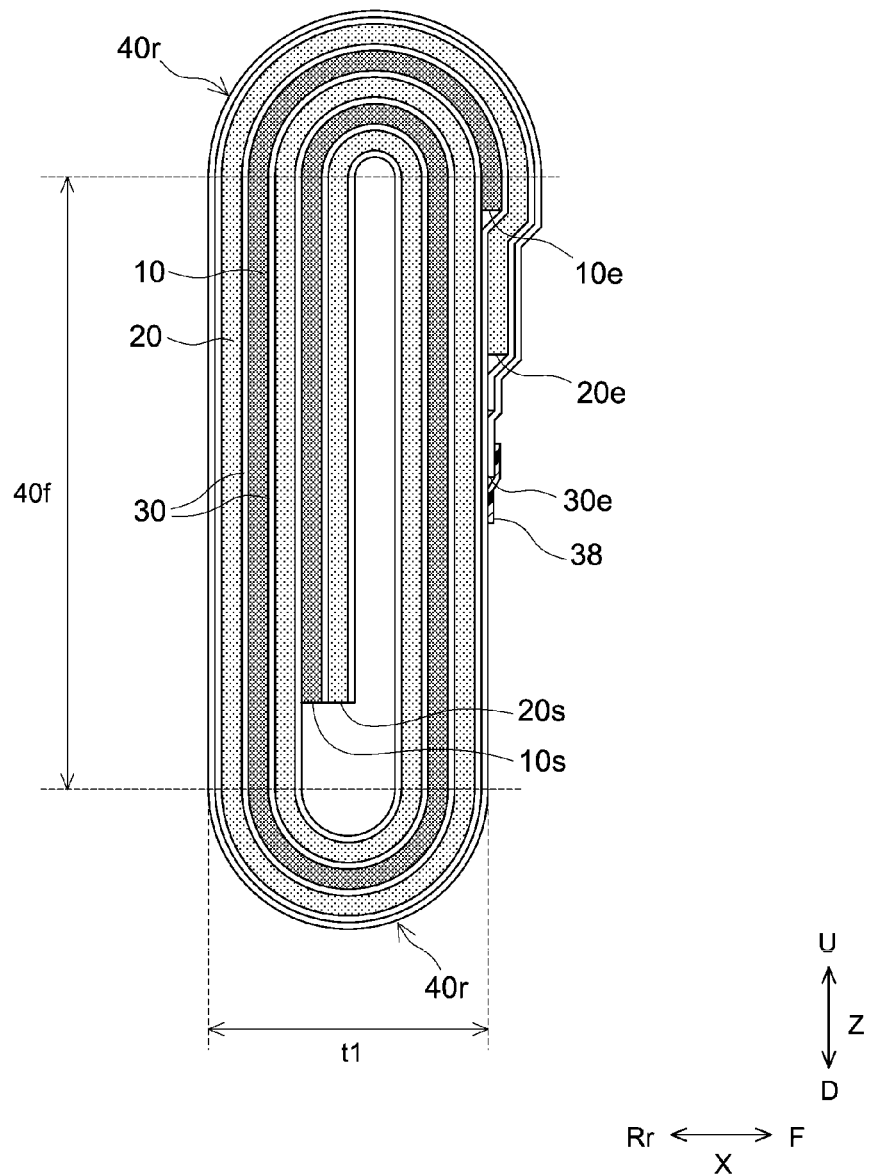
FIG. 9 is a schematic longitudinal cross-sectional diagram along line IX-IX in FIG. 8.
Figure 10:
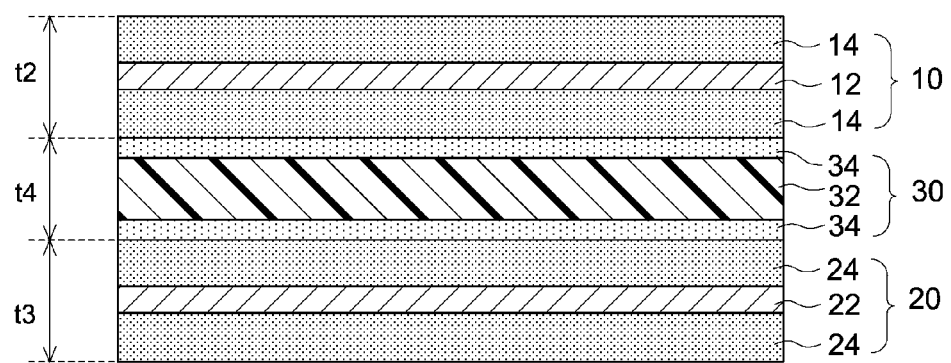
FIG. 10 is an enlarged-view diagram illustrating schematically an interface of a separator and a positive electrode plate and a negative electrode plate of a wound electrode body of a secondary battery according to an embodiment.

Embodiments of the secondary battery disclosed herein will be explained next with reference to FIG. 1 to FIG. 10. FIG. 1 is a perspective-view diagram illustrating schematically a secondary battery according to the present embodiment. FIG. 2 is a schematic longitudinal cross-sectional diagram along line II-II in FIG. 1. FIG. 3 is a schematic longitudinal cross-sectional diagram along line III-II in FIG. 1. FIG. 4 is a schematic transversal cross-sectional diagram along line IV-IV in FIG. 1. FIG. 5 is a perspective-view diagram illustrating schematically an electrode body attached to a sealing plate. FIG. 6 is a perspective-view diagram illustrating schematically an electrode body to which a positive electrode second collector and a negative electrode second collector are attached. FIG. 7 is a schematic diagram illustrating the configuration of a wound electrode body of a secondary battery according to the present embodiment. FIG. 8 is a front-view diagram illustrating schematically the wound electrode body of FIG. 7. FIG. 9 is a schematic longitudinal cross-sectional diagram along line IX-IX in FIG. 8. FIG. 10 is an enlarged-view diagram illustrating schematically an interface of a separator and a positive electrode plate and a negative electrode plate of a wound electrode body of a secondary battery according to the present embodiment.

As illustrated in FIG. 2, the secondary battery 100 according to the present embodiment includes wound electrode bodies 40 and a battery case 50 that accommodates the wound electrode bodies 40. A concrete configuration of such a secondary battery 100 will be explained next.

(1) Battery Case

The battery case 50 is a housing that accommodates the wound electrode bodies 40. Although not illustrated in the figures, also a nonaqueous electrolyte solution is accommodated inside the battery case 50. As illustrated in FIG. 1, the external shape of the battery case 50 in the present embodiment is a flat and bottomed cuboid shape (angular shape). A conventionally known material can be used in the battery case 50, without particular limitations. For example, the battery case 50 may be made of a metal. Examples of the material of the battery case 50 include aluminum, aluminum alloys, iron, iron alloys and the like.

As illustrated in FIG. 1 and FIG. 2, the battery case 50 includes an exterior body 52 and a sealing plate 54. The exterior body 52 is a flat bottomed square container having an opening 52h in the top face. The exterior body 52 has a planar and substantially rectangular bottom wall 52a, a pair of long side walls 52b extending upward in the height direction Z, from the long sides of the bottom wall 52a, and a pair of short side walls 52c extending upward in the height direction Z, from the short sides of the bottom wall 52a. The sealing plate 54 is a planar and substantially rectangular plate-shaped member that plugs the opening 52h of the exterior body 52. The outer peripheral edge portion of the sealing plate 54 is joined (for instance welded) to the outer peripheral edge portion of the opening 52h of the exterior body 52. As a result there is produced a battery case 50 the interior whereof is hermetically sealed. A liquid injection hole 55 and a gas discharge valve 57 are provided in the sealing plate 54. The liquid injection hole 55 is a through-hole provided for the purpose of injecting a nonaqueous electrolyte solution into the interior of the sealed battery case 50. The liquid injection hole 55 is sealed by a sealing member 56 after injection of the nonaqueous electrolyte solution. Further, the gas discharge valve 57 is a thin-walled portion designed to break (to open) when a large amount of gas is generated inside the battery case 50, and to discharge that generated gas.

(2) Electrolyte Solution

As described above, also an electrolyte solution (not shown) is accommodated, besides the wound electrode bodies 40, inside the battery case 50. Electrolyte solutions used in conventionally known secondary batteries can be used, without particular limitations, as the electrolyte solution. For instance a nonaqueous electrolyte solution in which a supporting salt is dissolved in a nonaqueous solvent can be used as the electrolyte solution. Examples of the nonaqueous solvent include carbonate solvents such as ethylene carbonate, dimethyl carbonate and ethyl methyl carbonate. Examples of the supporting salt include fluorine-containing lithium salts such as $LiPF_6$.

(3) Electrode Terminals

A positive electrode terminal 60 is attached to one end (left side in FIG. 1 and FIG. 2) of the sealing plate 54 in the width direction Y. The positive electrode terminal 60 is connected to a plate-shaped positive electrode external conductive member 62, on the outside of the battery case 50. Meanwhile, a negative electrode terminal 65 is attached to the other end (right side in FIG. 1 and FIG. 2) of the sealing plate 54 in the width direction Y. A plate-shaped negative electrode external conductive member 67 is attached to the negative electrode terminal 65. These external conductive members (positive electrode external conductive member 62 and negative electrode external conductive member 67) are connected to other secondary batteries and external devices via an external connecting member (bus bar or the like). The external conductive member is preferably made of a metal having excellent conductivity (aluminum, aluminum alloy, copper or a copper alloy).

(4) Electrode Collector

In the secondary battery 100 according to the present embodiment, a plurality (three) of wound electrode bodies 40 are accommodated in the battery case 50, as illustrated in FIG. 3 to FIG. 5. Although the detailed structure thereof will be described further on, each wound electrode body 40 has a positive electrode tab group 42 and a negative electrode tab group 44 (see FIG. 7 and FIG. 8). As illustrated in FIG. 2, the positive electrode terminal 60 described above is connected to the positive electrode tab groups 42 of the plurality of wound electrode bodies 40 via the positive electrode collector 70. The positive electrode collector 70 is accommodated inside the battery case 50. The positive electrode collector 70 has, as illustrated in FIG. 2 and FIG. 5, a positive electrode first collector 71 which is a plate-shaped conductive member extending, in the width direction Y, along the inner surface of the sealing plate 54, and a plurality of positive electrode second collectors 72 which are plate-shaped conductive member extending in the height direction Z. A lower end portion 60c of the positive electrode terminal 60 is inserted into the battery case 50 through a terminal insertion hole 58 of the sealing plate 54, and is connected to the positive electrode first collector 71 (see FIG. 2). Meanwhile, the positive electrode second collectors 72 are provided, in the secondary battery 100, in a number corresponding to the plurality of wound electrode bodies 40, as illustrated in FIG. 4 to FIG. 6. The positive electrode second collectors 72 are connected to respective positive electrode tab groups 42 of the wound electrode bodies 40. As illustrated in FIG. 4 and FIG. 5, the positive electrode tab groups 42 of the wound electrode bodies 40 are bent so that the positive electrode second collectors 72 and one side face 40a of the wound electrode bodies 40 oppose each other. The upper end portion of the positive electrode second collectors 72 and the positive electrode first collector 71 become electrically connected to each other as a result.

Meanwhile, the negative electrode terminal 65 is connected to the negative electrode tabs groups 44 of the plurality of wound electrode bodies 40 via the negative electrode collector 75. The connection structure on the negative electrode side is substantially identical to the connection structure on the positive electrode side described above. Specifically, the negative electrode collector 75 has a negative electrode first collector 76 which is a plate-shaped conductive member extending in the width direction Y along the inner surface of the sealing plate 54, and a plurality of negative electrode second collectors 77 which are plate-shaped conductive member extending in the height direction Z (see FIG. 2 and FIG. 5). A lower end portion 65c of the negative electrode terminal 65 is inserted into the battery case 50 through a terminal insertion hole 59, to be connected to the negative electrode first collector 76 (see FIG. 2). Meanwhile, each of the plurality of negative electrode second collectors 77 is connected to a respective negative electrode tab group 44 of the wound electrode bodies 40 (see FIG. 4 to FIG. 6). The negative electrode tab group 44 is bent so that the negative electrode second collectors 77 and the other side face 40b of the wound electrode bodies 40 oppose each other. The upper end portion of the negative electrode second collectors 77 and the negative electrode first collector 76 become electrically connected to each other as a result. A metal having excellent conductivity (aluminum, aluminum alloy, copper, copper alloy or the like) can be suitably used as the electrode collectors (positive electrode collector 70 and negative electrode collector 75).

(5) Insulating Member

In the secondary battery 100 various insulating members are further attached in order to prevent conduction between the wound electrode bodies 40 and the battery case 50. Specifically, a respective external insulating member 92 is interposed between the positive electrode external conductive member 62 (negative electrode external conductive member 67) and the outer surface of the sealing plate 54 (see FIG. 1). As a result it becomes possible to prevent conduction between the positive electrode external conductive member 62 or the negative electrode external conductive member 67 and the sealing plate 54. A respective gasket 90 is fitted to each of the terminal insertion holes 58, 59 of the sealing plate 54 (see FIG. 2). As a result it becomes possible to prevent conduction between the positive electrode terminal 60 (or negative electrode terminal 65), inserted into the terminal insertion holes 58, 59, and the sealing plate 54. Further, a respective internal insulating member 94 is disposed between the positive electrode first collector 71 (or the negative electrode first collector 76) and the inner surface of the sealing plate 54. This internal insulating member 94 includes a plate-shaped base portion 94a interposed between the positive electrode first collector 71 (or the negative electrode first collector 76) and the inner side surface of the sealing plate 54. As a result it becomes possible to prevent conduction between the positive electrode first collector 71 or the negative electrode first collector 76 and the scaling plate 54. Each internal insulating member 94 is further provided with a protruding portion 94b that protrudes from the inner surface of the sealing plate 54 towards the wound electrode bodies 40 (see FIG. 2 and FIG. 3). As a result it becomes possible to restrict the movement of the wound electrode bodies 40 in the height direction Z, and to prevent direct contact between the wound electrode bodies 40 and the sealing plate 54. In addition, the plurality of wound electrode bodies 40 are accommodated inside the battery case 50 in a state of being covered with an electrode body holder 98 (see FIG. 3) made up of an insulating resin sheet. This allows preventing as a result direct contact between the wound electrode bodies 40 and the exterior body 52. The material of each of the above-described insulating members is not particularly limited, so long as the material has predetermined insulating properties. As illustrative examples, there can be used synthetic resin materials such as polyolefin resins (for example polypropylene (PP) or polyethylene (PE)), and fluororesins (for example perfluoroalkoxy alkanes (PFAs) or polytetrafluoroethylene (PTFE)).

(6) Wound Electrode Bodies

As illustrated in FIG. 7, each electrode body used in the secondary battery 100 according to the present embodiment is a flat-shaped wound electrode body 40 resulting from winding a positive electrode plate 10 and a negative electrode plate 20 across a respective separator 30. In the secondary battery 100, the wound electrode bodies 40 are accommodated in the battery case 50 in such a manner that a winding axis WL of the wound electrode bodies 40 and the width direction Y of the secondary battery 100 substantially coincide with each other (see FIG. 2). That is, the term "winding axis direction" in the explanation below denotes substantially the same direction as the width direction Y in the figures.

(a) External Dimensions

Firstly, the wound electrode body 40 in the present embodiment has the external dimensions (width, thickness and height) below. The external dimensions of the wound electrode bodies in a secondary battery provided with a plurality of wound electrode bodies, as in the present embodiment, may be identical or may be different. The wound electrode bodies need not all have the external dimensions below, and it suffices that at least one wound electrode body has the external dimensions below. The springback suppression effect elicited by the art disclosed herein can be brought out also in such a case. In a case however where all the wound electrode bodies have the external dimensions below, springback occurs readily in the wound electrode bodies, and accordingly the effect elicited by the art disclosed herein is brought out yet more suitably.

Firstly, a width dimension w1 (see FIG. 7) of the positive electrode active material layer 14 in the present embodiment is preferably 200 mm or larger. A greater width dimension w1 of the positive electrode active material layer 14 entails a larger size of the wound electrode body 40; as a result, which the elastic action generated by the curved portions 40r after press molding tends to increase accordingly. The width dimension w1 of the positive electrode active material layer 14 is preferably from 200 mm to 400 mm, more preferably from 250 mm to 350 mm, and yet more preferably from 260 mm to 300 mm, and is for instance about 280 mm. Secondly, the thickness dimension t1 (see FIG. 9) of the wound electrode body 40 is preferably 8 mm or larger. The elastic action from the curved portions 40r after press molding is large also in a case where the thickness dimension t1 of the wound electrode body 40 is increased. The thickness dimension t1 of the wound electrode body 40 is preferably from 8 mm to 25 mm, more preferably from 8 mm to 20 mm, and yet more preferably from 10 mm to 15 mm, and is for instance about 12 mm. Thirdly, a height dimension h1 (see FIG. 8) of the wound electrode body 40 is preferably 120 mm or smaller. When the height dimension h1 of the wound electrode body 40 is made smaller, the curved portions 40r in the pair thereof draw close to each other, and as a result the elastic action generated by the curved portions 40r readily acts on the entirety of the flat portion 40f. The height dimension h1 of the wound electrode body 40 is preferably from 60 mm to 120 mm, more preferably from 80 mm to 110 mm, and yet more preferably from 90 mm to 100 mm, and is for instance about 94 mm.

As described above, the wound electrode body 40 in the present embodiment has external dimensions such that a large elastic action readily occurs in the curved portions 40r after press molding, and the elastic action from the curved portions 40r readily acts on the flat portion 40f. The secondary battery 100 according to the present embodiment, by contrast, has a configuration that allows properly suppressing springback even when using a wound electrode body 40 having external dimensions that readily give rise to springback. A concrete configuration of the wound electrode body 40 in the present embodiment will be explained next.

(b) Positive Electrode Plate

As illustrated in FIG. 7 and FIG. 10, the positive electrode plate 10 is an elongated band-shaped member. The positive electrode plate 10 has a positive electrode core body 12 which is a band-shaped metal foil, and a positive electrode active material layer 14 applied onto the surface of the positive electrode core body 12. From the viewpoint of battery performance, the positive electrode active material layer 14 is preferably applied onto both faces of the positive electrode core body 12. In the positive electrode plate 10, positive electrode tabs 12t protrude from one edge in the winding axis direction (width direction Y) towards the exterior (left side in FIG. 7). The positive electrode tabs 12t is formed as a plurality thereof, at predetermined intervals, in the longitudinal direction L of the elongated band-shaped positive electrode plate 10. Each positive electrode tab 12t is a region where the positive electrode active material layer 14 is not applied and the positive electrode core body 12 is exposed. A protective layer 16 extending in the longitudinal direction L of the positive electrode plate 10 is formed in a region adjacent to the edge of the positive electrode plate 10, on the side of the positive electrode tabs 12t.

Conventionally known materials that can be used in secondary batteries in general (for instance in lithium ion secondary batteries) can be utilized, without particular limitations, in the members that make up the positive electrode plate 10. For instance a metallic material having a predetermined conductivity can be preferably used in the positive electrode core body 12. Preferably, such a positive electrode core body 12 is for instance made up of aluminum or an aluminum alloy.

The positive electrode active material layer 14 is a layer containing a positive electrode active material. The positive electrode active material is a particulate material capable of reversibly storing and releasing charge carriers. A lithium-transition metal-based complex oxide is preferable as the positive electrode active material, from the viewpoint of stably producing a high-performance positive electrode plate 10. Particularly preferred among lithium-transition metal-based complex oxides is a lithium-transition metal-based complex oxide that contains at least one selected from the group consisting of nickel (Ni), cobalt (Co) and manganese (Mn) as the transition metal. Concrete examples include lithium-nickel-cobalt-manganese-based complex oxides (NCMs), lithium-nickel-based complex oxides, lithium-cobalt-based complex oxides, lithium-manganese-based complex oxides, lithium-nickel-manganese-based complex oxides, lithium-nickel-cobalt-aluminum-based complex oxides (NCAs), and lithium-iron-nickel-manganese-based-based complex oxides. Preferable examples of lithium-transition metal-based complex oxides not containing Ni, Co or Mn include lithium iron phosphate-based complex oxides (LFPs). The term "lithium-nickel-cobalt-manganese complex oxide" in the present specification encompasses oxides that contain an additional element, besides a main constituent element (Li, Ni, Co, Mn and O). Examples of such additional elements include transition metal elements and main-group metal elements such as Mg, Ca, Al, Ti, V, Cr, Si, Y, Zr, Nb, Mo, Hf, Ta, W, Na, Fe, Zn or Sn. The additional element may be a metalloid element such as B, C, Si or P, or a non-metal element such as S, F, Cl, Br or I. Although a detailed explanation will be omitted, the same applies to other lithium transition metal-based complex oxides notated as "-based complex oxides". Further, the positive electrode active material layer 14 may contain additives other than the positive electrode active material. Examples of such additives include conductive materials and binders. Concrete examples of conductive materials include carbon materials such as acetylene black (AB). Concrete examples of binders include resin binders such as polyvinylidene fluoride (PVdF). The content of the positive electrode active material relative to 100 mass % as the total solids of the positive electrode active material layer 14 is about 80 mass % or higher, and is typically 90 mass % or higher.

The protective layer 16 is a layer configured to have a lower electrical conductivity than that of the positive electrode active material layer 14. By providing the protective layer 16 in a region adjacent to an edge of the positive electrode plate 10 it becomes possible to prevent internal short circuits caused by direct contact between the positive electrode core body 12 and the negative electrode active material layer 24 when the separator 30 is damaged. Preferably, for instance a layer containing insulating ceramic particles is formed as the protective layer 16. Examples of such ceramic particles include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolite, apatite and kaolin; and glass fibers. Alumina, boehmite, aluminum hydroxide, silica and titania are preferred among the foregoing, in terms of insulation properties and heat resistance. The protective layer 16 may contain a binder for fixing the ceramic particles on the surface of the positive electrode core body 12. Examples of such a binder include resin binders such as polyvinylidene fluoride (PVdF). The protective layer is not an essential constituent element of the positive electrode plate. That is, a positive electrode plate having no protective layer formed thereon can also be used in the secondary battery disclosed herein.

The thickness t2 of the positive electrode plate 10 (see FIG. 10) is preferably 80 μm or larger, more preferably 100 μm or larger, and yet more preferably 120 μm or larger. The positive electrode plate 10 having such a sufficient thickness delivers a substantial elastic action after press molding, and therefore can constitute a factor that promotes springback. The art disclosed herein, however, allows suitably suppressing the occurrence of springback even when using a positive electrode plate 10 having such a thickness. From the viewpoint of facilitating springback prevention, the thickness of the positive electrode plate 10 is preferably 200 µm or smaller, more preferably 180 µm or smaller, and yet more preferably 160 µm or smaller. The term "thickness of the positive electrode plate" in the present specification denotes the total thickness of the positive electrode core body plus the positive electrode active material layer.

Further, the surface roughness of the positive electrode plate 10 (typically, the surface roughness of the positive electrode active material layer 14) is preferably 0.01 µm or larger, more preferably 0.02 µm or larger. Although details will be described later on, in the present embodiment the separator 30 and the positive electrode plate 10 are fitted to each other by causing the surface layer 34 of the separator 30 to deform conforming to the relief of the surface of the positive electrode plate 10; as a result, the separator 30 and the positive electrode plate 10 are bonded to each other, and springback is suppressed. From the viewpoint of suitably bonding the separator 30 and the positive electrode plate 10 to each other, preferably the positive electrode plate 10 has a certain or higher surface roughness. The upper limit of the surface roughness of the positive electrode plate 10 is not particularly limited, and may be 3 µm or smaller. The term "surface roughness" in the present specification denotes arithmetic mean roughness Ra.

Preferably, the positive electrode active material layer 14 includes large positive electrode active material particles having a peak particle size in the range from 10 µm to 20 µm and small positive electrode active material particles having a peak particle size in the range from 2 µm to 6 µm, in a particle size distribution analyzed by laser diffraction/scattering. By mixing thus two types of positive electrode active material particles having different particle sizes, fine irregularities become formed on the surface of the positive electrode active material layer 14, and as a result the positive electrode plate 10 and the separator 30 can be bonded to each other more suitably. The large particles and small particles described above may be of a lithium-transition metal-based complex oxide of the same type, or of lithium-transition metal-based complex oxides of different types.

Attempts have been made in recent years to form a positive electrode active material layer having a packing density of 2 g/cc or higher, from the viewpoint of increasing battery capacity. However, this type of high-density positive electrode active material layers exhibits a large reaction force against press molding, and accordingly such an active material layer may constitute a factor that promotes springback in the wound electrode body. By contrast, the art disclosed herein allows suitably suppressing springback of the wound electrode bodies, even upon formation of a high-density positive electrode active material layer of 2 g/cc or higher (suitably 2.5 g/cc or higher). In other words, the art disclosed herein allows easily using a high-density positive electrode active material layer that was difficult to use in conventional art, and can thus contribute to enhancing battery capacity. The packing density of the positive electrode active material layer 14 is preferably 4 g/cc or lower, from the viewpoint of properly preventing springback.

(c) Negative Electrode Plate

As illustrated in FIG. 7 and FIG. 10, the negative electrode plate 20 is an elongated band-shaped member. The negative electrode plate 20 is provided with a negative electrode core body 22 which is a band-shaped metal foil, and with a negative electrode active material layer 24 applied onto the surface of the negative electrode core body 22. From the viewpoint of battery performance, the negative electrode active material layer 24 is preferably applied onto both faces of the negative electrode core body 22. In the negative electrode plate 20, negative electrode tabs 22t protrude from one edge in the winding axis direction (width direction Y) towards the exterior (right side in FIG. 7). The negative electrode tabs 22t are formed as a plurality thereof, at predetermined intervals in the longitudinal direction L of the negative electrode plate 20. Each negative electrode tab 22t is a region where the negative electrode active material layer 24 is not applied and the negative electrode core body 22 is exposed.

Conventionally known materials that can be used in secondary batteries in general (for instance in lithium ion secondary batteries) can be utilized herein, without particular limitations, in the members that make up the negative electrode plate 20. For instance a metallic material having a predetermined conductivity can be preferably used in the negative electrode core body 22. Preferably, such a negative electrode core body 22 is for instance made up of copper or a copper alloy.

The negative electrode active material layer 24 is a layer containing a negative electrode active material. The negative electrode active material is not particularly limited, so long as charge carriers can be reversibly stored and released, in a relationship with the positive electrode active material described above, and thus materials that can be utilized in conventional secondary batteries in general can be used herein without particular limitations. Examples of such negative electrode active materials include carbon materials and silicon-based materials. For instance graphite, hard carbon, soft carbon, amorphous carbon and the like can be used as the carbon material. Amorphous carbon-coated graphite in which the surface of graphite is coated with amorphous carbon can also be used herein. Examples of silicon-based materials include silicon and silicon oxide (silica). The silicon-based material may contain a metal element (for instance an alkaline-earth metal), or an oxide thereof. The negative electrode active material layer 24 may contain additives besides the negative electrode active material. Examples of such additives include a binder and a thickener. Concrete examples of the binder include rubber-based binders such as styrene butadiene rubber (SBR). Concrete examples of the thickener include carboxymethyl cellulose (CMC). The content of the negative electrode active material relative to 100 mass % as the total solids of the negative electrode active material layer 24 is about 30 mass % or higher, and is typically 50 mass % or higher. The negative electrode active material may take up 80 mass % or higher, or 90 mass % or higher, of the negative electrode active material layer 24. A width dimension w2 of the negative electrode active material layer 24 is preferably from 200 mm to 450 mm, more preferably from 250 mm to 350 mm, and even more preferably from 260 mm to 320 mm.

A thickness t3 of the negative electrode plate 20 (see FIG. 10) is preferably 100 µm or larger, more preferably 130 µm or larger, and yet more preferably 160 µm or larger. Similarly to the above-described positive electrode plate 10, the occurrence of springback can be promoted when the negative electrode plate 20 is thicker. The art disclosed herein, by contrast, allows suitably suppressing the occurrence of springback even when using a negative electrode plate 20 having such a thickness. From the viewpoint of facilitating prevention of springback, the thickness of the negative electrode plate 20 is preferably 250 µm or smaller, more preferably 220 µm or smaller, and yet more preferably 190 µm or smaller. The term "thickness of the negative electrode plate" in the present specification is the total thickness of the negative electrode core body plus the negative electrode active material layer.

Similarly to the surface roughness of the positive electrode plate 10, the surface roughness of the negative electrode plate 20 (typically the surface roughness of the negative electrode active material layer 24) is preferably regulated from the viewpoint of suitably eliciting bonding between the separator 30 and the negative electrode plate 20. For instance the surface roughness of the negative electrode plate 20 is preferably 0.05 µm or larger, more preferably 0.1 µm or larger. As a result the separator 30 and the negative electrode plate 20 are properly bonded to each other, and the effect of suppressing springback is elicited yet more suitably. The upper limit of the surface roughness of the negative electrode plate 20 is not particularly restricted, and may be 5 µm or smaller.

(c) Separator

As illustrated in FIG. 7 and FIG. 9, each of the wound electrode bodies 40 in the present embodiment has two separators 30. Each separator 30 is an insulating sheet having formed therein a plurality of fine through-holes through which charge carriers can pass. Through interposition of the separators 30 between the positive electrode plate 10 and the negative electrode plate 20 it becomes possible to prevent contact between the positive electrode plate 10 and the negative electrode plate 20, and movement of charge carriers (for instance lithium ions) between the positive electrode plate 10 and the negative electrode plate 20.

As illustrated in FIG. 10, each separator 30 in the present embodiment has a band-shaped base material layer 32 and a surface layer 34 formed on the surface (both faces) of the base material layer 32. The detailed operation involved will be described later on, but in the present embodiment one surface layer 34 of each separator 30 having the above configuration and the positive electrode plate 10 are bonded to each other, and the other surface layer 34 and the negative electrode plate 20 are bonded to each other. As a result, expansion of the flat portion 40f of the wound electrode body 40 (see FIG. 9) in the thickness direction (depth direction X) is arrested, which allows in turn suppressing the occurrence of springback. The separators 30 having such a configuration will be explained next.

Firstly a material used in separators of conventionally known secondary batteries can be used, without particular limitations, in the base material layer 32. For instance the base material layer 32 is preferably a porous sheet-shaped member containing a polyolefin resin or the like. As a result, the flexibility of the separators 30 can be sufficiently ensured, and the wound electrode bodies 40 can be easily produced (wound and press molded). Polyethylene (PE), polypropylene (PP) or a mixture thereof can be used as the polyolefin resin. The porosity of the base material layer 32 is preferably from 20% to 70%, and more preferably from 30% to 60%. Charge carriers can be allowed to properly move as a result between the positive electrode plate 10 and the negative electrode plate 20. Unless otherwise noted, the term "porosity" in the present specification denotes porosity before press molding. The "porosity before press molding" can be obtained by performing a measurement on the separators disposed in regions not facing the positive electrode plate or the negative electrode plate. Examples of the "region not facing the positive electrode plate or the negative electrode plate" include a "region 30a in which only the separator 30 extends", formed on both side edges of the wound electrode body 40 in FIG. 7.

As illustrated in FIG. 10, the surface layer 34 in the present embodiment is a layer formed on both faces of the base material layer 32. The surface layer 34 contains inorganic particles and a binder. Examples of the inorganic particles include ceramic particles containing a ceramic such as alumina, silica, titania, boehmite, aluminum hydroxide, magnesium carbonate, magnesia, zirconia, zinc oxide, iron oxide, ceria or yttria as a main component. The surface layer 34 containing this type of inorganic particles exhibits excellent heat resistance. As a result, heat shrinkage of the separators 30 when the temperature rises can be suppressed, which can contribute to improve the safety of the secondary battery 100. Alumina particles and boehmite particles are particularly preferable, among the above ceramic particles, from the viewpoint of suppressing heat shrinkage of the separators 30. For instance, the average particle size of the inorganic particles is preferably from 0.15 µm to 2 µm, more preferably from 0.3 µm to 0.7 µm, and yet more preferably from 0.3 µm to 0.5 µm. Preferably, the specific surface area of the inorganic particles is for instance from about 2 $m^2/g$ to 13 $m^2/g$. The term "average particle size" in the present specification signifies particle size ($D_{50}$ particle size) at a cumulative value of 50% in a particle size distribution obtained by laser diffraction/scattering.

A conventionally known resin material having a certain viscosity can be used, without particular limitations, as the binder of the surface layer 34. For instance the binder of the surface layer 34 is preferably a resin material such as an acrylic resin, a polyolefin resin, a cellulosic resin or a fluororesin. A resin containing a polymer of an acrylic acid ester as a main component can be used as the acrylic resin. For instance polyethylene (PE) or polypropylene (PP) can be used as the polyolefin resin. For instance carboxymethyl cellulose (CMC) can be used as the cellulosic resin. For instance polyvinylidene fluoride (PVdF) can be used as the fluororesin. The surface layer 34 may contain two or more of these binder resins. Among the foregoing binder resins, PVdF can more suitably elicit adhesiveness to the electrode plates. The surface layer 34 preferably contains a binder of the same type as that of the binder of the electrode active material layer of the opposing electrode plate. As an example, in a case where the positive electrode active material layer 14 contains PVdF, it is preferable to use PVdF as the binder of the surface layer 34 that opposes the positive electrode active material layer 14. This allows further increasing the adhesive strength between the surface layer 34 and the positive electrode plate 10.

Preferably, the content of the inorganic particles is adjusted so that the surface layer 34 exhibits a predetermined adhesiveness towards the positive electrode plate 10 (or the negative electrode plate 20). For instance the content of the inorganic particles in the surface layer 34 is preferably lower than 90 mass %, and is more preferably 85 mass % or lower, and particularly preferably 80 mass % or lower. When the content of inorganic particles in the surface layer 34 is thus kept at or below a given value, the surface layer 34 deforms readily at the time of press molding, and accordingly the effect of suppressing springback elicited through fitting (bonding) of the positive electrode plate 10 (or negative electrode plate 20) and the surface layer 34 can be properly brought out as a result. When conversely the content of the inorganic particles in the surface layer 34 is reduced too much, the content of the resin material such as a binder becomes relatively large, and the surface layer 34 before press molding may develop tackiness as a result. In such a case it may be difficult to wind the positive electrode plate 10 and the negative electrode plate 20 across the separators 30. From this viewpoint, the content of the inorganic particles in the surface layer 34 is preferably 60 mass or higher, more preferably 65 mass % or higher, and particularly preferably 70 mass % or higher. By forming the surface layer 34 containing thus no less than a certain amount of inorganic particles it becomes possible to suitably prevent internal short circuits derived from heat shrinkage of the separators 30. The term "content of inorganic particles" in the present specification denotes the mass ratio of inorganic particles relative to the total mass of the surface layer.

The surface layer 34 preferably has a mesh-like structure that includes a plurality of voids. Such a surface layer 34 has inorganic particles dispersed in the interior of the binder resin having been cured to a mesh shape. The surface layer 34 having this mesh-like structure has high flexibility, and accordingly deforms so as to be crushed during press molding. Variability in the thickness t1 of the wound electrode bodies 40 can therefore be absorbed by the separators 30, and thus precipitation of charge carriers due to variability in inter-electrode distance can be suppressed as a result. The porosity of the surface layer 34 having a mesh-like structure is preferably 50% or higher, more preferably 60% or higher, and particularly preferably 70% or higher. As a result, suitable flexibility can be imparted to the surface layer 34, and variability in the thickness t1 of the wound electrode bodies 40 can be suppressed. In terms of strength of the separator 30, on the other hand, the porosity of the surface layer 34 is preferably 90% or lower, more preferably 80% or lower.

Preferably, the surface layer 34 having the mesh-like structure is formed so that the packing density on the electrode plate side (outward of the separator 30) is higher than the packing density on the base material layer 32 side (inward of the separator 30). As a result, the surface layer 34 on the base material layer 32 side is pressure-deformed preferentially at the time of press molding, thanks to which the voids in the surface layer 34 on the electrode plate side can be prevented from collapsing. It becomes accordingly possible to suppress drops in the permeability of the electrolyte solution into the vicinity of the electrode plates, and to contribute for instance to prevent dry-out.

The thickness t4 of the separator 30 (see FIG. 10) is preferably 4 μm or larger, more preferably 8 μm or larger, and yet more preferably 12 μm or larger. Similarly to the positive electrode plate 10 and the negative electrode plate 20 described above, an increase in the thickness t4 of the separator 30 tends to promote generation of springback. However, the art disclosed herein allows suitably suppressing the occurrence of springback even when using separators 30 of sufficient thickness such as those described above. From the viewpoint of readily preventing the occurrence of springback, the thickness of the separators 30 is preferably 28 μm or smaller, more preferably 24 μm or smaller, and yet more preferably 20 μm or smaller. The term "thickness t4 of the separator 30" in the present specification denotes the total thickness of the base material layer 32 plus the surface layer 34.

2. Method for Producing a Secondary Battery

The structure of the secondary battery 100 according to the present embodiment has been described above. The effect of suppressing springback elicited by the art disclosed herein will be specifically explained next while describing a procedure for producing the secondary battery 100. The method for producing the secondary battery 100 according to the present embodiment includes (1) a winding step, (2) a press molding step, and (3) an accommodation step.

(1) Winding Step

In the present step there is firstly produced a stack resulting from laying up a separator 30, a negative electrode plate 20, a separator 30 and a positive electrode plate 10, in this order (see FIG. 7). Herein the stacking position of each sheet member in the width direction Y is regulated so that only the positive electrode tabs 12t of the positive electrode plate 10 protrudes from one side edge (left side in FIG. 7) in the width direction Y, and so that only the negative electrode tabs 22t of the negative electrode plate 20 protrude from the other side edge (right side in FIG. 7). Then, a cylindrical wound body (cylindrical body) is produced by winding the produced stack. The number of winding turns at this time is preferably adjusted as appropriate taking into consideration the performance and production efficiency of the target secondary battery 100. The art disclosed herein allows easily realizing a wound electrode body 40 having 20 or more winding turns. Specifically, springback after press molding described below is particularly prone to occur in a wound electrode body 40 having 20 or more winding turns, and accordingly such a wound electrode body has been difficult to produce stably. However, the art disclosed herein allows suitably suppressing springback, and accordingly allows producing stably a wound electrode body 40 having 20 or more winding turns. The wound electrode body 40 illustrated in FIG. 9 has a significantly reduced number of winding turns, for convenience of explanation. That is, the number of winding turns of the wound electrode bodies disclosed herein is not limited to the number of winding turns of the wound electrode body 40 illustrated in FIG. 9.

(2) Press Molding Step

In the present step a flat-shaped wound electrode body 40 (see FIG. 9) is produced through pressing of a wound cylindrical body. As illustrated in FIG. 9, the flat-shaped wound electrode body 40 after press molding has a pair of curved portions 40r the outer surface of which is curved, and a flat portion 40f the outer surface of which, connecting the pair of curved portions 40r, is flat. As illustrated in FIG. 7 and FIG. 8, the positive electrode tab group 42 having the positive electrode tabs 12t laid thereon is formed at one end portion, in the width direction Y, of the flat-shaped wound electrode body 40 after press molding, while the negative electrode tab group 44 having the negative electrode tabs 22t laid thereon is formed at the other end. A core portion 46 in which the positive electrode active material layer 14 and the negative electrode active material layer 24 face each other is formed in the central portion of the wound electrode body 40 in the width direction Y.

In the present embodiment a surface layer 34 of each separator 30 is bonded to the positive electrode plate 10 (negative electrode plate 20) at the time of press molding. Specifically, the wound body is squashed at the time of press molding, and accordingly significant pressure acts upon the sheet-shaped members (positive electrode plate 10, negative electrode plate 20 and separators 30) positioned at the flat portion 40f. In the present embodiment, for instance the content of inorganic particles in the surface layer 34 and the press molding pressure are regulated, so that the surface layer 34 deforms as a result in accordance with the irregularities on the surface of the positive electrode active material layer 14 (or the negative electrode active material layer 24). As a result, each separator 30 and the positive electrode plate 10 (negative electrode plate 20) become fitted and bonded to each other at the interface between the separator 30 and the positive electrode plate 10 (or negative electrode plate 20) in the flat portion 40f of the wound electrode body 40. Expansion of the flat portion 40f can be restricted and springback can be suppressed as a result, even when an elastic action is exerted on the flat portion 40f by the curved portions 40r after press molding.

The adhesive strength of the electrode plate (typically the positive electrode plate 10) and the surface layer 34 disposed at the flat portion 40f of the wound electrode body 40 prior to accommodation in the battery case 50 is preferably 0.5 N/m or larger, more preferably 0.75 N/m or larger, and yet more preferably 1.0 N/m or larger. Preferably, the content of the inorganic particles in the surface layer 34 and the press molding pressure are regulated so that a suitable adhesive strength is ensured between the surface layer 34 and each electrode plate. Springback in the wound electrode body 40 after press molding can be suppressed yet more suitably as a result. The term "adhesive strength" in the present specification denotes 90° peel strength according to JIS Z0237.

As illustrated in FIG. 8 and FIG. 9, in the present embodiment the separator 30 is then disposed on the outermost peripheral surface of the wound electrode body 40 after press molding. The shape of the wound electrode body 40 is maintained through attachment of the winding stop tape 38 to a termination portion 30e of the separator 30. The winding stop tape 38 is preferably disposed on a straight line connecting the positive electrode tab group 42 and the negative electrode tab group 44. As a result, unwinding of the wound electrode body 40 can be prevented, and hence it becomes possible to more suitably curtail widening of the inter-electrode distance in the flat portion 40f in the vicinity of the electrode tabs groups (positive electrode tab group 42 and negative electrode tab group 44), and to stably join the electrode tab groups and the collectors (positive electrode collector 70 and negative electrode collector 75).

In a case where the winding stop tape 38 is affixed to the termination portion 30e of the separator 30, preferably the flexibility of the surface layer 34 and the press molding pressure are regulated so that the proportion of the thickness of the surface layer 34 before press molding relative to the thickness of the surface layer 34 after press molding is 0.9 or lower (more preferably 0.8 or lower, yet more preferably 0.7 or lower, and particularly preferably 0.6 or lower). In consequence it becomes possible to absorb the thickness of the winding stop tape 38 through pressure deformation of the surface layer 34, and to prevent the occurrence of large level differences at the flat portion 40f. As a result this allows suppressing deterioration of battery performance due to variability in surface pressure on the flat portion 40f. This effect can be elicited particularly suitably in the secondary battery 100 having a plurality of wound electrode bodies 40, such as that of the present embodiment. Similarly to the "porosity of the surface layer before press molding" described above, the "thickness of the surface layer before press molding" can be detected by performing a measurement in a region at which the negative electrode plate and the positive electrode plate do not face each other (for instance the region denoted by the reference symbol 30a in FIG. 7). On the other hand, the "thickness of the surface layer after press molding" can be measured on the basis of the thickness of the surface layer 34 of the separator 30 that is interposed (for instance in the vicinity of the central portion of the flat portion 40f) between the positive electrode plate 10 and the negative electrode plate 20.

In the wound electrode body 40 after press molding, as illustrated in FIG. 9, one end portion of the band-shaped positive electrode plate 10 in the longitudinal direction is disposed inside the wound electrode body 40, as a positive electrode start portion 10s. The other end portion of the positive electrode plate 10 is disposed, as a positive electrode termination portion 10e, outside the wound electrode body 40. Similarly, one end portion of the band-shaped negative electrode plate 20 is disposed inside the wound electrode body 40, as a negative electrode start portion 20s. The other end portion of the negative electrode plate 20 is disposed, as a negative electrode termination portion 20e, outside the wound electrode body 40. Thus, the positive electrode start portion 10s, the positive electrode termination portion 10e, the negative electrode start portion 20s, and the negative electrode termination portion 20e described above are all disposed at the flat portion 40f of the wound electrode body 40.

In the wound electrode body 40 having the structure illustrated in FIG. 9, preferably the adhesive strength between the positive electrode start portion 10s and the surface layer 34 (see FIG. 10) is larger than the adhesive strength between the positive electrode termination portion 10e and the surface layer 34. As a result, the adhesive strength in the interior of the wound electrode body 40 is increased, and hence the effect of suppressing springback can be elicited yet more suitably. In a case where the wound electrode body 40 is produced so that the adhesive strength in the interior thereof is increased, the thickness of the surface layer 34 bonded to the positive electrode start portion 10s inside the electrode body is smaller than the thickness of the surface layer 34 that is bonded to the positive electrode termination portion 10e.

In the wound electrode body 40 illustrated in FIG. 9, preferably, the adhesive strength between the positive electrode termination portion 10e and the surface layer 34 is higher than the adhesive strength between the negative electrode termination portion 20e and the surface layer 34. This is preferable for instance from the viewpoint of preventing dry-out since, as a result, the electrolyte solution permeates readily in the vicinity of the surface of the negative electrode plate 20. In a case where the wound electrode body 40 is produced so that the adhesive strength between the negative electrode termination portion 20e and the surface layer 34 decreases relatively, the thickness of the surface layer 34 that is bonded to the positive electrode termination portion 10e is smaller than the thickness of the surface layer 34 that is bonded to the negative electrode termination portion 20e.

Preferably, the adhesive strength between the positive electrode termination portion 10e and the surface layer 34 is larger at the central portion in the winding axis direction (width direction Y) than at both side edges. As a result, expansion of the central portion of the flat portion 40f can be restricted more strongly, and springback can be suitably suppressed. Specifically, the adhesive strength in the central portion in the winding axis direction is preferably about 1.03 times to about 1.1 times the adhesive strength at both side edges. In a wound electrode body 40 having such a configuration the thickness of the surface layer 34 positioned at the central portion in the width direction Y is smaller than the thickness of the surface layer 34 positioned at both end portions.

Substantial pressure does not act on the curved portions 40r of the wound electrode body 40 during press molding. As a result, the surface layer 34 of the separators 30 positioned in the curved portions 40r tends to be larger than the surface layer 34 of the separators 30 positioned at the flat portion 40f. Specifically, the thickness of the surface layer 34 in the curved portions 40r can be 1.5 times to 3 times the thickness of the surface layer 34 at the flat portion 40f. More specifically, the thickness of the surface layer 34 in the curved portions 40r tends to be thicker by about 1 μm than the thickness of the surface layer 34 at the flat portion 40f.

(3) Accommodation Step

In the present step the wound electrode body 40 molded in the press molding step is accommodated inside the battery case 50. Specifically, the positive electrode second collectors 72 are joined to the positive electrode tab group 42 of the wound electrode body 40 and the negative electrode second collectors 77 are joined to the negative electrode tab group 44, as illustrated in FIG. 6. Then a plurality of wound electrode bodies 40 (three in the figure) are arrayed so that respective flat portions 40f face each other, as illustrated in FIG. 5. The sealing plate 54 is disposed above the plurality of wound electrode bodies 40, and the positive electrode tab groups 42 of the respective wound electrode bodies 40 are bent so that the positive electrode second collectors 72 and one side face 40a of one of the wound electrode bodies 40 oppose each other. The positive electrode first collector 71 and the positive electrode second collectors 72 become connected as a result. Similarly, the negative electrode tab groups 44 of the wound electrode bodies 40 are bent so that the negative electrode second collectors 77 and the other side face 40b of the wound electrode bodies 40 oppose each other. The negative electrode first collector 76 and the negative electrode second collectors 77 become connected thereby. As a result, the wound electrode bodies 40 are attached to the sealing plate 54 via the positive electrode collector 70 and the negative electrode collector 75.

In the connection between the sealing plate 54 and the wound electrode bodies 40 described above, stress at the time of bending of the electrode tab groups acts on the flat portion 40f in the vicinity of the electrode tab groups (positive electrode tab group 42 and negative electrode tab group 44). As a result, the inter-electrode distance increases at the flat portion 40f in the vicinity of the electrode tab groups, and hence charge carrier precipitation or the like may occur. In the present embodiment, however, the electrode plates and the separators 30 are bonded to each other, and accordingly it becomes possible to prevent increases in inter-electrode distance even under the action of stress at the time of bending of the electrode tab groups. The present embodiment can contribute to achieve stable joining between the electrode tab groups and the electrode collectors.

In the present step, next, the wound electrode bodies 40 attached to the sealing plate 54 are covered by the electrode body holder 98 (see FIG. 3) and thereafter are accommodated inside the exterior body 52. As a result, the flat portions 40f of the wound electrode bodies 40 oppose respective long side walls 52b of the exterior body 52 (i.e. the flat surfaces of the battery case 50). The upper curved portions 40r oppose the sealing plate 54, and the lower curved portions 40r oppose the bottom wall 52a of the exterior body 52. The opening 52h at the top face of the exterior body 52 is plugged by the sealing plate 54, after which the exterior body 52 and the sealing plate 54 are joined (welded), to thereby construct the battery case 50. Thereafter, the electrolyte solution is injected into the battery case 50 through the liquid injection hole 55 of the sealing plate 54, and the liquid injection hole 55 is plugged by the sealing member 56. The secondary battery 100 according to the present embodiment is produced thus as a result of the above steps. As described above, in such a secondary battery 100 the separators 30 and the electrode plates are bonded to each other via the surface layer 34, thanks to which it becomes possible to suppress springback after press molding. Increases in battery resistance and charge carrier precipitation caused by increases in inter-electrode distance can be suppressed as a result. The thickness dimension t1 of the wound electrode body 40 after press molding can be maintained, and accommodation of the wound electrode body 40 in the exterior body 52 can be facilitated, which in turn allows contributing also to improving production efficiency.

Other Embodiments

An embodiment of the art disclosed herein has been explained above. The above-described embodiment illustrates an example to which the art disclosed herein is applied, but is not meant to limit the art disclosed herein. Other embodiments of the art disclosed herein will be explained next.

(1) Surface on which the Surface Layer is Formed

In the embodiments described above, the surface layer 34 is formed on both faces of the base material layer 32. However, the surface layer need not be formed on both faces of the base material layer, and it suffices that the surface layer be formed on at least one face of the surface of the base material layer. Preferably, the surface layer is formed on both faces of the base material layer, for instance in terms of adhesiveness between the separator and the electrode bodies, and in terms of suppression of heat shrinkage in the separator. As described above, the surface layer tends to exhibit better adhesiveness towards the positive electrode plate than to the negative electrode plate. Such being the case, the surface layer is preferably formed on the face in contact with the positive electrode plate, in a case where the surface layer is to be formed in just one surface of the base material layer.

(2) Number of Wound Electrode Bodies

In the secondary battery 100 according to the above-described embodiment three wound electrode bodies 40 are accommodated inside the battery case 50. However, the number of electrode bodies accommodated within one battery case is not particularly limited, and may be two or more (plurality of electrode bodies), or one. Springback can occur in each wound electrode body 40 of a secondary battery 100 provided with a plurality of wound electrode bodies 40 such as that illustrated in FIG. 3. In this case the influence of springback on the performance of the entire secondary battery 100 is prone to be significant. In the art disclosed herein, by contrast, a structure can be adopted that suppresses springback in each of the plurality of wound electrode bodies 40. As a result the art disclosed herein can be utilized, particularly suitably, in the secondary battery 100 provided with a plurality of wound electrode bodies 40.

In the secondary battery 100 having a plurality of wound electrode bodies 40 it is preferable, as in the above-described embodiment, that each separator 30 having the surface layer 34 be disposed at the outermost periphery of the wound electrode bodies 40. In consequence, adjacent wound electrode bodies 40 are bonded to each other across respective separators 30 at the outermost periphery, and accordingly movement of the wound electrode bodies 40 in the interior of the battery case 50 can be therefore restricted. As a result it becomes possible to prevent damage to the wound electrode bodies 40 caused by an external impact or vibration (external force). In a case for instance where the wound electrode bodies 40 and the electrode collectors (positive electrode second collector 72 and negative electrode second collector 77) are connected via the electrode tab groups (positive electrode tab group 42 and negative electrode tab group 44), as illustrated in FIG. 6, the electrode tab groups may break due to movement of the wound electrode bodies 40 on account of an external force. By contrast, movement of the wound electrode bodies 40 can be restricted, and damage to the electrode tab groups can be prevented, through bonding of the plurality of wound electrode bodies 40 across the separators 30. In a case where the wound electrode bodies 40 are bonded across the separators 30, it is preferable that the adhesive strength between adjacent wound electrode bodies 40 be larger than the adhesive strength between the positive electrode termination portion 10e and the surface layer 34 (see FIG. 9). As a result the movement of the wound electrode bodies 40 can be restricted more reliably, and damage to the wound electrode bodies 40 (for instance the electrode tab groups) can be prevented yet more suitably.

In a case where the separator 30 is disposed at the outermost periphery of the wound electrode bodies 40, the wound electrode bodies 40 on both outer sides in the depth direction X and the electrode body holder 98 can be bonded to each other via the surface layer 34 of that separator 30. As a result it becomes possible to restrict more reliably the movement of the wound electrode bodies 40 within the battery case 50, and in consequence to prevent damage to the wound electrode bodies 40 yet more suitably.

The present disclosure has been explained in detail above, but the explanation is merely illustrative in character. That is, the art disclosed herein encompasses various alterations and modifications of the concrete examples described above.

What is claimed is:

1. A secondary battery comprising a flat-shaped wound electrode body in which a positive electrode plate and a negative electrode plate are wound across a separator, and a battery case that accommodates the wound electrode body, wherein
    the flat-shaped wound electrode body has a pair of curved portions, the outer surfaces of which are curved, and a flat portion, the outer surface of which is flat, and which connects the pair of curved portions,
    the positive electrode plate has a band-shaped positive electrode core body and a positive electrode active material layer formed on at least one surface of the positive electrode core body,
    the separator has a band-shaped base material layer, and a surface layer formed on at least one surface of the base material layer, and containing inorganic particles and a binder,
    at least one of the positive electrode plate and the negative electrode plate in the flat portion is bonded to the surface layer of the separator,
    a width dimension of the positive electrode active material layer is 200 mm or larger, a thickness dimension of the wound electrode body is 8 mm or larger, and a height dimension of the wound electrode body is 120 mm or smaller, and
    the surface layer of the separator contains polyvinylidene fluoride as the binder.

2. The secondary battery according to claim 1, wherein a content of the inorganic particles relative to a total mass of the surface layer is from 70 mass % to 80 mass %.

3. The secondary battery according to claim 1, wherein the surface layer contains at least one type of alumina particles and boehmite particles, as the inorganic particles.

4. The secondary battery according to claim 1, wherein the surface layer has a mesh-like structure containing a plurality of voids.

5. The secondary battery according to claim 4, wherein porosity of the surface layer of the separator disposed in a region not opposing the positive electrode plate or the negative electrode plate is 50% or higher.

6. The secondary battery according to claim 1, wherein the wound electrode body is provided in plurality and accommodated inside the battery case.

7. The secondary battery according to claim 6, wherein the separator is disposed at an outermost periphery of the wound electrode body, and adjacent wound electrode bodies are bonded to each other via the surface layer of the separator.

8. The secondary battery according to claim 1, wherein
    a positive electrode tab group, which is a stack of positive electrode tabs of an exposed positive electrode core body, is formed at one end portion of the wound electrode body in a winding axis direction, and a negative electrode tab group, which is a stack of negative electrode tabs of the exposed negative electrode core body, is formed at another end portion of the wound electrode body in the winding axis direction, and
    the positive electrode tab group is bent in a state of being joined to a positive electrode collector which is a plate-shaped conductive member, and the negative electrode tab group is bent in a state of being joined to a negative electrode collector which is a plate-shaped conductive member.

9. The secondary battery according to claim 8, wherein
    the separator is disposed at an outermost periphery of the wound electrode body, and a termination portion of the separator is affixed to the outermost surface of the wound electrode body by a winding stop tape, and
    the winding stop tape is disposed on a straight line that joins the positive electrode tab group and the negative electrode tab group.

10. The secondary battery according to claim 1, wherein
    the separator is disposed at the outermost periphery of the wound electrode body, a termination portion of the separator is affixed to the outermost surface of the wound electrode body by a winding stop tape, and
    a proportion of a thickness of the surface layer of the separator interposed between the positive electrode plate and the negative electrode plate, relative to a thickness of the surface layer of the separator disposed in a region not opposing the positive electrode plate or the negative electrode plate, is 0.9 or lower.

11. The secondary battery according to claim 1, wherein
    one end portion of the positive electrode plate in a longitudinal direction is disposed, as a positive electrode start portion, inside the flat portion of the wound electrode body, and another end portion is disposed, as a positive electrode termination portion, outside the flat portion of the wound electrode body, and
    one end portion of the negative electrode plate in the longitudinal direction is disposed, as a negative electrode start portion, inside the flat portion of the wound electrode body, and another end portion is disposed, as a negative electrode termination portion, outside the flat portion of the wound electrode body.

12. A secondary battery comprising a flat-shaped wound electrode body in which a positive electrode plate and a negative electrode plate are wound across a separator, and a battery case that accommodates the wound electrode body, wherein
    the flat-shaped wound electrode body has a pair of curved portions, the outer surfaces of which are curved, and a flat portion, the outer surface of which is flat, and which connects the pair of curved portions, the positive electrode plate has a band-shaped positive electrode core body and a positive electrode active material layer formed on at least one surface of the positive electrode core body, the separator has a band-shaped base material layer, and a surface layer formed on at least one surface of the base material layer, and containing inorganic particles and a binder, at least one of the positive electrode plate and the negative electrode plate in the flat portion is bonded to the surface layer of the separator, a width dimension of the positive electrode active material layer is 200 mm or larger, a thickness dimension of the wound electrode body is 8 mm or larger, and a height dimension of the wound electrode body is 120 mm or smaller, one end portion of the positive electrode plate in a longitudinal direction is disposed, as a positive electrode start portion, inside the flat portion of the wound electrode body, and another end portion is disposed, as a positive electrode termination portion, outside the flat portion of the wound electrode body, one end portion of the negative electrode plate in the longitudinal direction is disposed, as a negative electrode start portion, inside the flat portion of the wound electrode body, and another end portion is disposed, as a negative electrode termination portion, outside the flat portion of the wound electrode body, and an adhesive strength between the positive electrode start portion and the surface layer is larger than an adhesive strength between the positive electrode termination portion and the surface layer.

13. A secondary battery comprising a flat-shaped wound electrode body in which a positive electrode plate and a negative electrode plate are wound across a separator, and a battery case that accommodates the wound electrode body, wherein the flat-shaped wound electrode body has a pair of curved portions, the outer surfaces of which are curved, and a flat portion, the outer surface of which is flat, and which connects the pair of curved portions, the positive electrode plate has a band-shaped positive electrode core body and a positive electrode active material layer formed on at least one surface of the positive electrode core body, the separator has a band-shaped base material layer, and a surface layer formed on at least one surface of the base material layer, and containing inorganic particles and a binder, at least one of the positive electrode plate and the negative electrode plate in the flat portion is bonded to the surface layer of the separator, a width dimension of the positive electrode active material layer is 200 mm or larger, a thickness dimension of the wound electrode body is 8 mm or larger, and a height dimension of the wound electrode body is 120 mm or smaller, one end portion of the positive electrode plate in a longitudinal direction is disposed, as a positive electrode start portion, inside the flat portion of the wound electrode body, and another end portion is disposed, as a positive electrode termination portion, outside the flat portion of the wound electrode body, one end portion of the negative electrode plate in the longitudinal direction is disposed, as a negative electrode start portion, inside the flat portion of the wound electrode body, and another end portion is disposed, as a negative electrode termination portion, outside the flat portion of the wound electrode body, and the adhesive strength between the positive electrode termination portion and the surface layer is larger than an adhesive strength between the negative electrode termination portion and the surface layer.

14. A secondary battery comprising a flat-shaped wound electrode body in which a positive electrode plate and a negative electrode plate are wound across a separator, and a battery case that accommodates the wound electrode body, wherein the flat-shaped wound electrode body has a pair of curved portions, the outer surfaces of which are curved, and a flat portion, the outer surface of which is flat, and which connects the pair of curved portions, the positive electrode plate has a band-shaped positive electrode core body and a positive electrode active material layer formed on at least one surface of the positive electrode core body, the separator has a band-shaped base material layer, and a surface layer formed on at least one surface of the base material layer, and containing inorganic particles and a binder, at least one of the positive electrode plate and the negative electrode plate in the flat portion is bonded to the surface layer of the separator, a width dimension of the positive electrode active material layer is 200 mm or larger, a thickness dimension of the wound electrode body is 8 mm or larger, and a height dimension of the wound electrode body is 120 mm or smaller, a plurality of the wound electrode bodies are accommodated inside the battery case, the separator is disposed at the outermost periphery of the wound electrode bodies, and adjacent the wound electrode bodies are bonded to each other via the surface layer of the separator, and an adhesive strength between the adjacent wound electrode bodies is larger than the adhesive strength between the positive electrode termination portion and the surface layer.

15. A method for producing a secondary battery, the method comprising:

producing a cylindrical body by winding of a positive electrode plate and a negative electrode plate across a separator;

producing a flat-shaped wound electrode body by pressing the cylindrical body; and accommodating the wound electrode body in the interior of a battery case, wherein the wound electrode body is the wound electrode body of any one of claim 1.

* * * * *